United States Patent
Wilson et al.

(10) Patent No.: US 9,128,545 B2
(45) Date of Patent: *Sep. 8, 2015

(54) TOUCH SCREEN SHIELD

(75) Inventors: Stephen S. Wilson, Las Vegas, NV (US); Bart Wilson, Las Vegas, NV (US); Seth Wilson, Las Vegas, NV (US)

(73) Assignee: Racing Optics, Inc., Las Vegas, NV (US)

( * ) Notice: Subject to any disclaimer, the term of this patent is extended or adjusted under 35 U.S.C. 154(b) by 1080 days.

This patent is subject to a terminal disclaimer.

(21) Appl. No.: 12/780,443

(22) Filed: May 14, 2010

(65) Prior Publication Data

US 2011/0279383 A1    Nov. 17, 2011

(51) Int. Cl.
*G06F 3/041* (2006.01)
*G06F 1/16* (2006.01)
(Continued)

(52) U.S. Cl.
CPC . *G06F 3/041* (2013.01); *B32B 3/06* (2013.01); *B32B 7/045* (2013.01); *B32B 37/0076* (2013.01); *B32B 37/12* (2013.01); *B32B 37/18* (2013.01); *B32B 38/10* (2013.01); *G06F 1/1633* (2013.01); *B32B 2250/02* (2013.01); *B32B 2457/20* (2013.01); *B32B 2457/208* (2013.01); *B32B 2551/00* (2013.01); *B32B 2571/00* (2013.01); *G06F 2203/04103* (2013.01);
(Continued)

(58) Field of Classification Search
CPC .................. G09F 1/1637; G09F 3/041; G09F 2200/1634; G09F 2200/1633; G06F 1/1637; G06F 1/1633; G06F 3/041; G06F 2200/1634; G06F 2200/1633; G06F 2203/04103; G06F 2203/04107; Y10T 156/10; Y10T 156/1052; Y10T 428/24744; Y10T 428/28; Y10T 428/14
USPC .................................................. 345/156–179
See application file for complete search history.

(56) References Cited

U.S. PATENT DOCUMENTS 3,948,662 A * 4/1976 Alston et al. .................. 396/586
3,950,580 A * 4/1976 Boudet ......................... 428/42.2
(Continued)

FOREIGN PATENT DOCUMENTS

DE         198 08 535      9/1999
EP         0192075 A2      8/1986
(Continued)

OTHER PUBLICATIONS

Jake Gaecke, "Appletell reviews the iVisor for IPad", appletell.com, Sep. 15, 2010 at 12:32PM, www.technologytell.com/apple/60407/appletell-reviews-ivisor-ag-for-ipad/.
(Continued)

*Primary Examiner* — Patricia L Nordmeyer
(74) *Attorney, Agent, or Firm* — Stetina Brunda Garred & Brucker

(57) ABSTRACT

A shield that is attachable to a touch sensitive screen is disclosed. The shield may be attached to the touch sensitive screen only at its outer peripheral portion. An air gap is enclosed between the shield and the touch sensitive screen to form a planar air bearing. The shield preferably does not touch the active area of the touch sensitive screen when the user is not touching the shield but only viewing the touch sensitive screen through the shield. This mitigates unwanted optical artifacts such as trapped air bubbles, Newton rings and chromatic interference while maintaining the sensitivity of the touch sensitive screen.

21 Claims, 5 Drawing Sheets

(51) Int. Cl.
*B32B 3/06* (2006.01)
*B32B 7/04* (2006.01)
*B32B 37/00* (2006.01)
*B32B 37/12* (2006.01)
*B32B 37/18* (2006.01)
*B32B 38/10* (2006.01)

(52) U.S. Cl.
CPC ..... *G06F2203/04107* (2013.01); *Y10T 156/10* (2015.01); *Y10T 156/1052* (2015.01); *Y10T 428/14* (2015.01); *Y10T 428/24744* (2015.01)

(56) References Cited

U.S. PATENT DOCUMENTS

| | | | |
|---|---|---|---|
| 3,987,569 A | 10/1976 | Chase | |
| 4,204,231 A | 5/1980 | Permenter | |
| 4,696,860 A | 9/1987 | Epperson | |
| 4,889,754 A * | 12/1989 | Vargas | 428/41.4 |
| 4,907,090 A * | 3/1990 | Ananian | 348/823 |
| 5,486,883 A | 1/1996 | Candido | |
| RE35,318 E * | 8/1996 | Warman | 313/479 |
| 5,593,786 A | 1/1997 | Parker et al. | |
| 5,668,612 A | 9/1997 | Hung | |
| 5,896,991 A | 4/1999 | Hippely et al. | |
| 6,250,765 B1 | 6/2001 | Murakami | |
| 6,305,073 B1 | 10/2001 | Badders, Jr. | |
| 6,469,752 B1 | 10/2002 | Ishikawa et al. | |
| 6,536,589 B2 | 3/2003 | Chang | |
| 6,555,235 B1 | 4/2003 | Aufderheide et al. | |
| 6,559,902 B1 * | 5/2003 | Kusuda et al. | 349/12 |
| 6,592,950 B1 | 7/2003 | Toshima et al. | |
| 6,614,423 B1 | 9/2003 | Wong et al. | |
| 6,654,071 B2 | 11/2003 | Chen | |
| 6,660,389 B2 | 12/2003 | Liu et al. | |
| 6,667,738 B2 | 12/2003 | Murphy | |
| 6,750,922 B1 | 6/2004 | Benning | |
| 6,777,055 B2 * | 8/2004 | Janssen et al. | 428/41.8 |
| 6,800,378 B2 | 10/2004 | Hawa et al. | |
| 6,841,190 B2 | 1/2005 | Liu et al. | |
| 6,847,492 B2 | 1/2005 | Wilson et al. | |
| 6,864,882 B2 | 3/2005 | Newton | |
| 6,870,686 B2 | 3/2005 | Wilson et al. | |
| 6,879,319 B2 | 4/2005 | Cok | |
| 6,995,976 B2 | 2/2006 | Richardson | |
| 7,070,837 B2 | 7/2006 | Ross | |
| 7,184,217 B2 | 2/2007 | Wilson et al. | |
| 7,226,176 B1 | 6/2007 | Huang | |
| 7,351,470 B2 | 4/2008 | Drahelm et al. | |
| 7,495,895 B2 | 2/2009 | Carnevali | |
| 7,629,052 B2 | 12/2009 | Brumwell | |
| 8,044,942 B1 | 10/2011 | Leonhard | |
| 8,693,102 B2 | 4/2014 | Wilson et al. | |
| 8,974,620 B2 | 3/2015 | Wilson et al. | |
| 2002/0101411 A1 | 8/2002 | Chang | |
| 2002/0122925 A1 | 9/2002 | Liu et al. | |
| 2002/0195910 A1 | 12/2002 | Hus et al. | |
| 2003/0012936 A1 | 1/2003 | Draheim et al. | |
| 2003/0087054 A1 * | 5/2003 | Janssen et al. | 428/40.1 |
| 2003/0110613 A1 | 6/2003 | Ross | |
| 2004/0004605 A1 * | 1/2004 | David | 345/173 |
| 2004/0109096 A1 | 6/2004 | Anderson et al. | |
| 2004/0121105 A1 * | 6/2004 | Janssen et al. | 428/40.1 |
| 2004/0227722 A1 | 11/2004 | Friberg et al. | |
| 2006/0114245 A1 | 6/2006 | Masters et al. | |
| 2007/0181456 A1 * | 8/2007 | Kusuda et al. | 206/443 |
| 2007/0211002 A1 | 9/2007 | Zehner et al. | |
| 2007/0212508 A1 | 9/2007 | Mase | |
| 2007/0229962 A1 | 10/2007 | Mason, Jr. | |
| 2008/0030631 A1 | 2/2008 | Gallagher | |
| 2008/0055258 A1 | 3/2008 | Sauers | |
| 2009/0054115 A1 | 2/2009 | Horrdin et al. | |
| 2009/0086415 A1 | 4/2009 | Chipping | |
| 2009/0087655 A1 | 4/2009 | Yamada et al. | |
| 2010/0026646 A1 | 2/2010 | Xiao et al. | |
| 2010/0033442 A1 * | 2/2010 | Kusuda et al. | 345/173 |
| 2010/0102197 A1 | 4/2010 | McIntyre | |
| 2010/0238119 A1 | 9/2010 | Dubrovsky et al. | |
| 2010/0245273 A1 | 9/2010 | Hwang et al. | |
| 2010/0270189 A1 | 10/2010 | Padersen, II et al. | |
| 2011/0012841 A1 | 1/2011 | Lin | |
| 2011/0267793 A1 | 11/2011 | Cohen et al. | |
| 2012/0003431 A1 | 1/2012 | Huang | |
| 2012/0183712 A1 | 7/2012 | Leonhard et al. | |
| 2012/0188743 A1 | 7/2012 | Wilson et al. | |

FOREIGN PATENT DOCUMENTS

| | | |
|---|---|---|
| EP | 1471415 | 10/2004 |
| JP | 4314537 | 11/1992 |
| JP | 4314547 | 11/1992 |
| JP | 2002328613 | 11/2002 |
| TW | 200700793 | 1/2007 |
| TW | 201027992 | 7/2010 |
| WO | WO 03052678 | 6/2003 |

OTHER PUBLICATIONS

"What makes NuShield Screen Protectors Superior", nushield.com, www.nushield.com/technology.php.
www.spigen.com.
"Invisible Shield", zagg.com, www.zagg.com/invisibleshield/apple-ipad-2-3g-cases-screen-protectorscovers-skins-shields-I.php.
"Invisible Gadget Guard, the original", gadgetguard.com, www.gadgetguard.com/guard.
"Protect your iPhone 4 with Screen Protectors from Incipio", incipotech.com.
http://store-moshimonde.com/visor-ag-ipad.html., Jul. 2010.
http://store-moshimonde.com/visor-xt-ipad.html, Aug. 2010.
http://store-moshimonde.com/ivisorag-for-ipad2-black.html, Mar. 2011.
http://store-moshimonde.com/ivisorag-for-ipad2-white.html, Mar. 2011.
http://store-moshimonde.com/ivisorag-ag-iphone4-black.html, Nov. 2010.
http://store-moshimonde.com/ivisor-ag-iphone4-white.html; May 2010.
English translation of application TW 201027993, Monitor Protection Device for a Flat Panel Display.
Defendant's Motion for Summary of Judgment, Oct. 25, 2013. pp. 1-31.
www.store.moshimode.com, "iVisor AG for iPad 2 black", 2004-2010.
Prosecution History of U.S. Appl. No. 95/002,073 titled Touch Screen Protector pp. 1-1,980.

\* cited by examiner

TOUCH SCREEN SHIELD

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to transparent films applied to touch sensitive screens for impact and/or scratch protection.

Electronic devices such as the iPhone have a touch sensitive screen by which the user may operate the electronic device. The touch sensitive screen displays electronic buttons and search boxes that the user can select by touch. These touch sensitive screens are very large and subject to cracking and scratching during normal use by the user as well as when the electronic device is dropped. The resulting damage may be costly to repair and may require replacement of the entire electronic device or phone. Accordingly, there is a need for a low cost device that will cushion and absorb an impact that could break or scratch the glass face of the electronic device and yet not interfere with the functionality and sensitivity of the touch screen or the quality of the image displayed on the screen.

Prior art films do exist that are adhered to the touch sensitive screen. Unfortunately, these protective films leave unsightly air bubbles between the transparent protective film and the transparent glass of the electronic device. Moreover, these films provide no impact absorption protection to the glass face.

Based on the foregoing, there is a need in the art for an improved protective film for touch sensitive screens.

BRIEF SUMMARY

The touch screen shield disclosed herein addresses the needs discussed above, discussed below and those that are known in the art.

The touch screen shield disclosed herein may comprise a base transparent layer that is attached to a touch sensitive screen of an electronic device. A planar air bearing may be formed between the base transparent layer and the touch sensitive screen by attaching only the outer peripheral portion of the base transparent layer to the touch sensitive screen. The air gap may be continuous and planar between the base transparent layer and the touch sensitive screen by adhering a protective liner to the underside of the base transparent layer. The protective liner has an outer periphery which is smaller than the outer periphery of the base transparent layer so as to form a step. When the outer peripheral portion of the base transparent layer is adhered to the touch sensitive screen, the base transparent layer is placed into tension by the step thereby lifting the protective liner above and off of the touch sensitive screen. Additionally, the adhesive surrounding the base transparent layer forms an enclosed air gap and traps air between the base transparent layer and the touch sensitive screen. These factors promote formation of the planar air bearing between the base transparent layer and the touch sensitive screen.

The air gap between the base transparent layer and the touch sensitive screen may also be formed by forming a thick adhesive layer at the outer peripheral portion of the base transparent layer. The adhesive is sufficiently thick so that the base transparent layer is lifted off of the touch sensitive screen when the touch screen shield is mounted to the electronic device.

It is also contemplated that in any of the embodiments discussed herein of the shield, one or more sacrificial layers may be mounted on top of the base transparent layer. The sacrificial layers may be removed one at a time from top to bottom as the top most sacrificial layer is damaged. The additional layers provide additional impact protection and retains flexibility so that touch sensitivity of the touch sensitive screen is not compromised.

It is also contemplated that the shield may be formed with an opaque border (e.g., black, pattern, etc.) to hide air bubbles that might form between the outer peripheral portion of the base transparent layer and the touch sensitive screen.

More particularly, a transparent shield for a touch sensitive screen of a device is disclosed. The shield may comprise a first transparent layer, a thin layer of pressure sensitive adhesive and a second transparent layer. The first transparent layer may define opposed first and second sides. The first transparent layer may also define an outer periphery. The thin layer of pressure sensitive adhesive may be disposed on an outer peripheral portion of the second side of the first transparent layer. The second transparent layer may define opposed first and second sides. The first side of the second transparent layer may be attached to a central portion of the second side of the first transparent layer. An outer periphery of the second transparent layer may be smaller than the outer periphery of the first transparent layer so as to define a step.

The outer peripheral portion of the first transparent layer may be attached to the device so that the central portion of the second side of the first transparent layer is positioned on top of the touch sensitive screen of the device. The first transparent layer may be placed in tension when the outer peripheral portion of the first transparent layer is attached to the device.

The shield may further comprise adhesive disposed between the central portion of the second side of the first transparent layer and the second transparent layer for attaching the first and second transparent layer to each other. The adhesive disposed on the outer peripheral portion of the second side of the first transparent layer may be protected by a removable liner. The adhesive may form an enclosed air gap between the shield and touch sensitive screen. The enclosed air gap may form a planar air bearing.

The shield may further comprise one or more transparent sacrificial layers peelably removable from each other and the first side of the first transparent layer so that a top most sacrificial layer may be removed as desired. The first and second transparent layers may be thicker compared to the one or more sacrificial layers. The sacrificial layers may have staggered tabs for assisting in the peeling of the top most sacrificial layer. A peel value between the sacrificial layers may be progressively stronger as the top most sacrificial layer is peeled away.

The adhesive and the first and second transparent layers may have a difference in index of refraction less than 0.2.

The shield may further comprise an opaque annular film at an outer peripheral portion of the first transparent layer.

Moreover, a transparent shield for a touch sensitive screen of a device is disclosed. The shield may comprise a first transparent layer and a pressure sensitive adhesive. The first transparent layer may define opposed first and second sides. The pressure sensitive adhesive may be disposed only at an outer peripheral portion of the second side of the first transparent layer. The pressure sensitive adhesive may be sufficiently thick so as to form an air gap between the first transparent layer and the touch sensitive screen when the shield is mounted to the electronic device. The air gap may be a planar air bearing.

The outer peripheral portion of the first transparent layer may be attached to the device so that the central portion of the second side of the first transparent layer is positioned on top of the touch sensitive screen of the device.

The shield may further comprise one or more transparent sacrificial layers peelably removable from each other and the first side of the first transparent layer so that a top most sacrificial layer may be removed as desired.

The shield may further comprise an opaque annular film at an outer peripheral portion of the first transparent layer.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
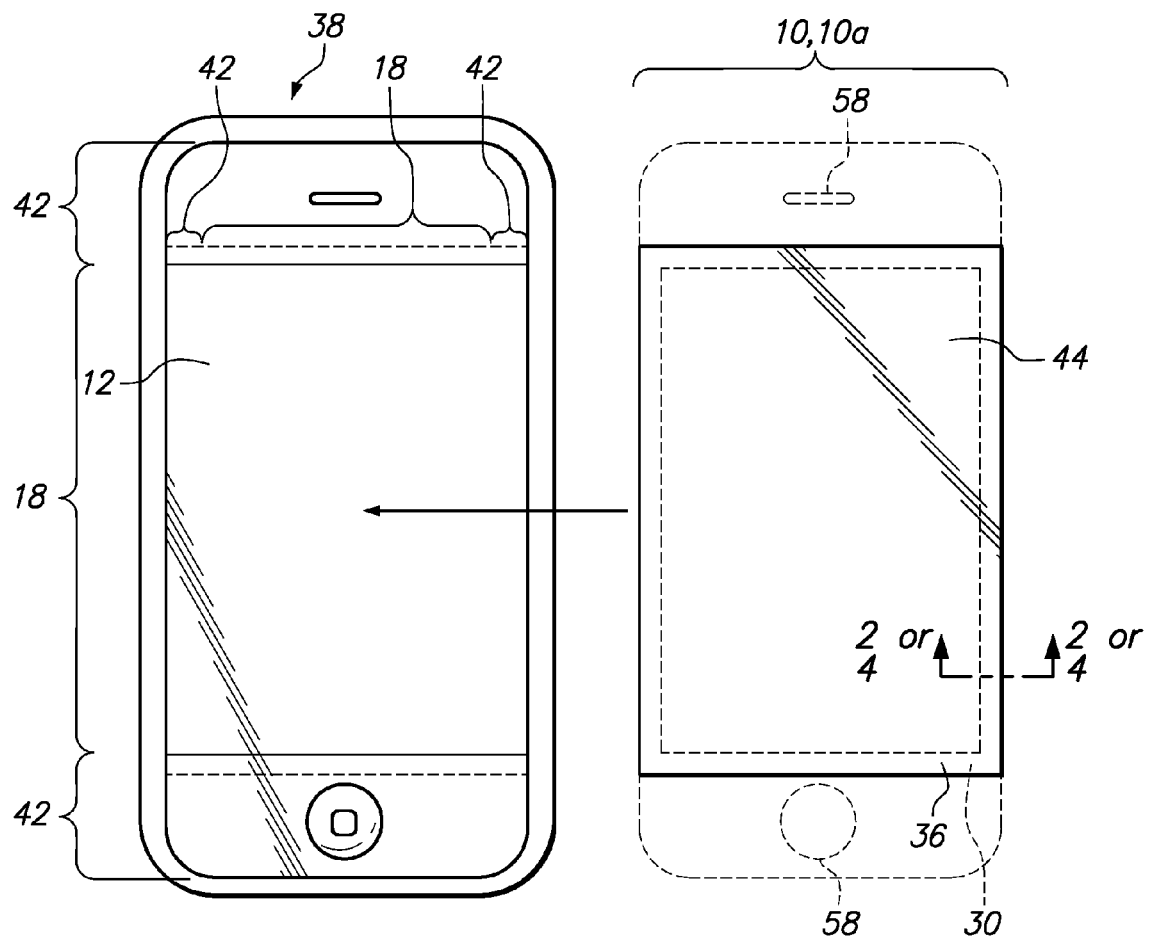
FIG. 1 is an exploded top view of an electronic device with a shield mountable thereon.

Referring now to the drawings, a shield 10 for a touch sensitive screen 12 is shown. The shield 10 protects the touch sensitive screen 12 from scratches, impacts, etc. The shield 10 is damaged instead of the touch sensitive screen 12. When the shield 10 is scratched, dented, etc. to a degree that makes viewing the touch sensitive screen 12 unacceptable for the user, the shield 10 may be replaced with a new shield 10. Optionally, the shield 10 may have one or more sacrificial layers 14 which may be individually peeled off from each other starting from the top most layer going down to the base shield 10 as the top most sacrificial layer 14 is damaged. The sacrificial layers 14a-h may be mounted on top of the shield 10, 10a. When the shield 10 is attached to the touch sensitive screen 12, an air gap 16 (see FIG. 3) may be formed between the shield 10 and an active area 18 of the touch sensitive screen 12. The air gap 16 eliminates unwanted optical artifacts such as trapped area bubbles, Newton rings and chromatic interference while maintaining the sensitivity of the touch sensitive screen 12.

Figure 2:
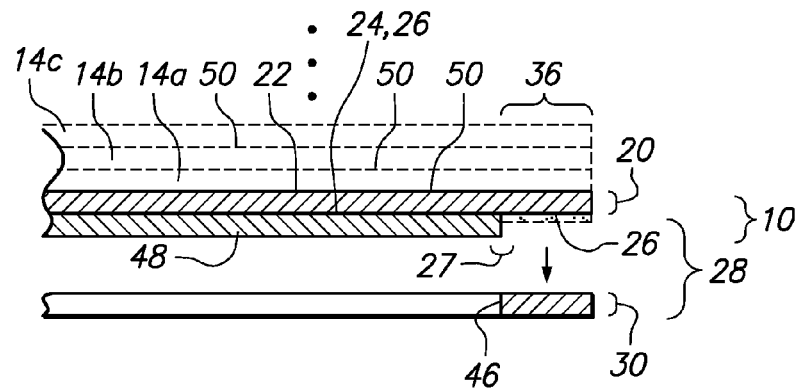
FIG. 2 is a cross sectional view of the shield shown in FIG. 1.
Figure 3:
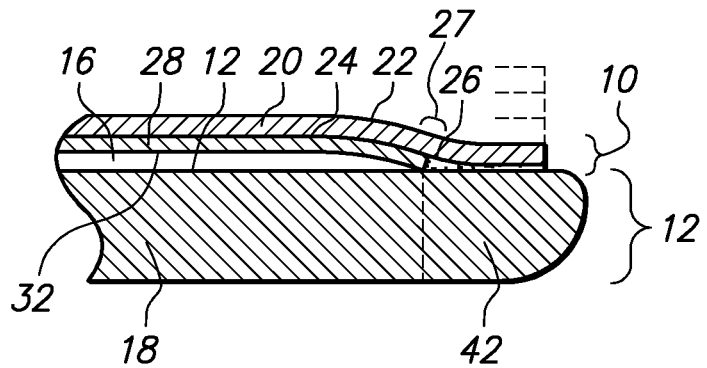
FIG. 3 is a cross sectional view of the shield mounted to the electronic device shown in FIG. 1.

The air gap 16 may be formed by providing a base transparent layer 20 which defines an exposed side 22 and an interior side 24 (see FIG. 3). The interior side 24 may be coated with a pressure sensitive adhesive 26 (e.g., acrylic adhesive). The pressure sensitive adhesive 26 may cover the entire interior side 24 of the base transparent layer 20. A protective liner 28 may cover the pressure sensitive adhesive 26 coated on the interior side 24 and be attached to the protective liner 28. When the shield 10 is ready to be mounted to the touch sensitive screen 12, an outer peripheral portion 30 (see FIG. 2) or annulus of the protective liner 28 may be removed from the base transparent layer 20 to expose the adhesive 26 only at the outer peripheral portion of the base transparent layer 20 on the interior side 24. A step 27 (see FIGS. 2 and 3) is formed at the outer peripheral edge of the protective liner 28. The shield 10 may be attached to the touch sensitive screen 12 as shown in FIG. 3. More particularly, the entire outer periphery of the base transparent layer 20 may be adhered to the touch sensitive screen 12 so as to form an enclosed air gap 16 and form a planar air bearing. The base transparent layer 20 is tensioned about the step 27. Since an interior side 32 (see FIG. 3) of the protective liner 28 does not have any adhesive, a continuous air gap 16 may be formed between the protective liner 28 and the exposed side 34 of the touch sensitive screen 12.

Figure 4:
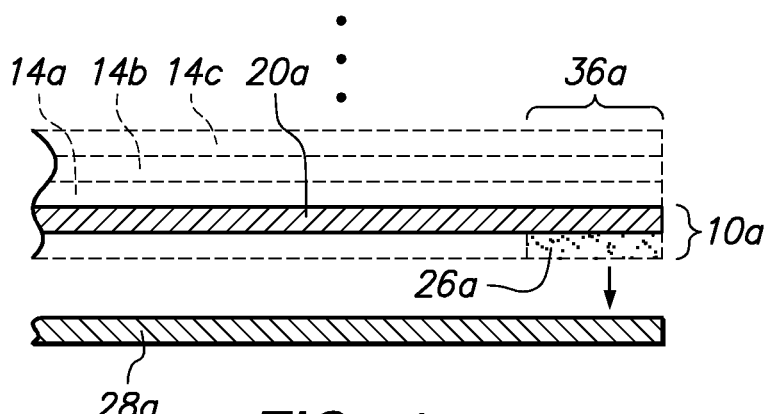
FIG. 4 is a cross sectional view of a second embodiment of the shield shown in FIG. 1.
Figure 5:
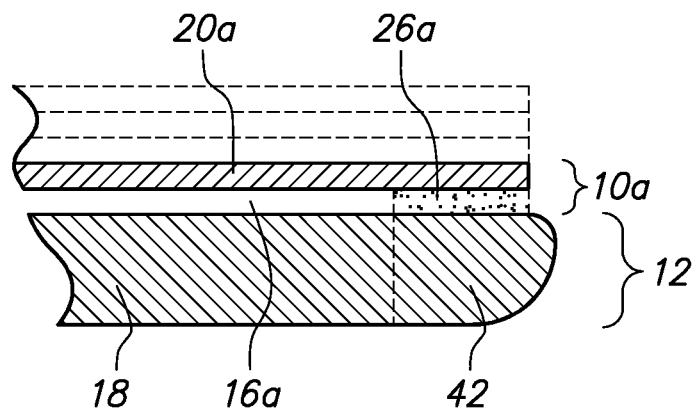
FIG. 5 is a cross sectional view of the second embodiment of the shield and the electronic device shown in FIG. 1.

Alternatively, a base transparent layer 20a may be provided with an adhesive 26a only on the outer peripheral portion 36 of the base transparent layer 20a, as shown in FIG. 4. The shield 10 may be attached to the touch sensitive screen 12 by way of the adhesive 26a, as shown in FIG. 5. The adhesive 26a may be sufficiently thick such that upon adhesion of the base transparent layer 20a to the touch sensitive screen 12, air gap 16a is formed, as shown in FIG. 5.

Moreover, it is contemplated that an opaque film 52 (see FIGS. 6-8) may be disposed at the outer peripheral portion 36 of the base transparent layer 20 to hide any air bubbles 60 that might form between the outer peripheral portion 36 of the base transparent layer 20 and the touch sensitive screen 12.

More particularly, referring now back to FIG. 1, an electronic device 38 such as an iPhone is shown. It is also contemplated that the electronic device 38 may be any type of visual display for photographs, video, etc. The electronic device 38 may have a touch sensitive screen 12 which allows a user to operate the electronic device 38. The touch sensitive screen 12 may define an active area 18. In the active area 18, the user may depress various electronic buttons, keys, etc. electronically displayed on the active area 18 to operate the electronic device 38 so as to play video, navigate, start applications, etc. The active area 18 may be disposed adjacent or enclosed within an inactive area 42.

The active area 18 of the touch sensitive screen 12 may be protected by disposing the shield 10 over the touch sensitive screen 12. To this end, the shield 10 may be adhered to the touch sensitive screen 12 wherein only the outer peripheral portion of the shield 10 is adhered to the touch sensitive screen 12. A continuous air gap 16 may exist between the central portion 44 of the shield 10 and the touch sensitive screen 12. Preferably, the adhesive 26 used to adhere the outer peripheral portion of the shield 10 to the touch sensitive screen 12 contacts only the inactive area 42. However, it is also contemplated that the adhesive 26 may adhere the shield 10 also to an outer peripheral portion of the active area 18.

Referring now to FIGS. 2 and 3, the shield 10 may comprise the base transparent layer 20. The base transparent layer 20 may be fabricated from a transparent material (e.g., biaxially-oriented polyethylene terephalate material (boPET), etc.). The base transparent layer 20 may be approximately 4 mil thick (i.e., 0.004"). Adhesive 26 may be coated on a majority, if not the entire, interior side 24 of the base transparent layer 20. To protect the adhesive 26 from dirt and grime prior to installation on the touch sensitive screen, the protective liner 28 may cover the entire interior side 24 of the base transparent layer 20. The adhesive 26 attaches the protective liner 28 to the base transparent layer 20. A cut or slit 46 may be made through the protective liner 28 so as to define an outer peripheral portion 30 or annulus of the protective liner 28 and a central portion 48 of the protective liner 28. The cut or slit 46 may be made with a rotary die, steel rule die, lasers or other methods known in the art.

When the user is ready to attach the shield 10 to the touch sensitive screen 12 of the electronic device 38, the user removes the outer peripheral portion 30 of the protective liner 28 from the shield 10 as shown in FIG. 2. For example, the user may apply a small piece of tape to the outer peripheral portion 30 and peel the outer peripheral portion 30 off of the base transparent layer 20. This exposes the adhesive 26 only at the outer peripheral portion 36 of the base transparent layer 20. This also creates the step 27 between the protective layer 28 still remaining on the base transparent layer 20 and the base transparent layer 20. The user aligns the shield 10 to the touch sensitive screen 12 and applies pressure to the outer peripheral portion 36 of the base transparent layer 20 so that the adhesive 26 adheres the base transparent layer 20 to the touch sensitive screen 12. Preferably, the adhesive 26 is disposed only on the inactive area 42 of the touch sensitive screen 12. The adhesive 26 traps air between the base transparent layer 20 and the touch sensitive screen 12 to form the enclosed air gap 16. Also, the air gap 16 (see FIG. 3) may define a planar air bearing due to tension applied to the base transparent layer 20 about the step 27. The enclosed air gap 16 and the tension lifts the shield 10 off of active area 18 to form a planar air bearing to mitigate unwanted optical artifacts such as trapped air bubbles, Newton rings, and chromatic interference while maintaining the sensitivity of the touch screen. It is also contemplated that the adhesive 26 may be disposed on a portion of the active area 18 at the outer peripheral portion of the active area 18. In this manner, a majority of the active area 18 has an air gap 16 between the touch sensitive screen 12 and the shield 10.

Optionally, the shield 10 may have one or more sacrificial layers 14a-n. The sacrificial layers 14 may be adhered to each other by way of a peelable adhesive disposed between each of the sacrificial layers 14 as well as a bottommost sacrificial layer 14a and the exposed side 22 of the base transparent layer 20. During use of the electronic device 38, the topmost sacrificial layer 14c may become dented, scratched, etc. or otherwise damaged such that viewing through the shield 10 may be unacceptable. At this point, the topmost sacrificial layer 14c may be removed (e.g., peeled) from the shield 10. This uncovers a fresh, clean sacrificial layer 14b. The other sacrificial layers 14b and 14a may be removed top-down as the topmost sacrificial layer 14 becomes damaged. There may be one or more sacrificial layers 14a-n or stack of sacrificial layers 14a-n adhered to the base transparent layer 20. Preferably, there are between two (2) to ten (10) sacrificial layers 14a-n. The sacrificial layers 14a-n may be fabricated from a transparent material such as biaxially-oriented polyethelene terephalate (boPET).

Referring now to a second embodiment shown in FIGS. 4 and 5, a shield 10a may comprise base transparent layer 20a. A thick coat of adhesive 26a may be applied only to the underside of the outer peripheral portion 36a of the base transparent layer 20a. Protective liner 28a may be placed over the thick adhesive coating 26a to protect the adhesive 26a from dirt and grime up until prior to installation of the shield 10a to the touch sensitive screen 12. After removing the protective liner 28a from the shield 10a, the shield 10a is aligned to the touch sensitive screen 12. In particular, the adhesive 26a is preferably aligned to the inactive area 42 of the touch sensitive screen. Air gap 16a is formed between the base transparent layer 20a and the touch sensitive screen 12. The thick adhesive 26a lifts the base transparent layer 20a off of the active area 40 to form the planar air bearing, as shown in FIG. 5.

Optionally, one or more sacrificial layers 14a-n as discussed above in relation to FIGS. 2 and 3 may be mounted to the shield 10a. The sacrificial layers 14a-n may be removed one by one as the topmost sacrificial layer is damaged (e.g., dented, scratched, etc.).

Figure 6:
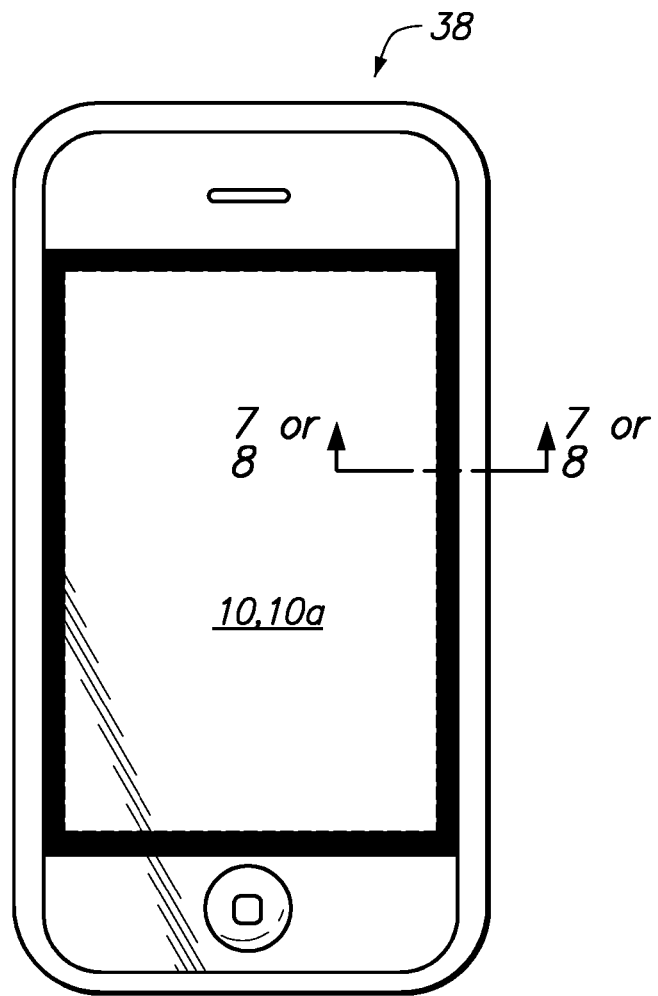
FIG. 6 is a top view of the electronic device shown in FIG. 1 with a shield having an opaque border for hiding air bubbles.
Figure 7:
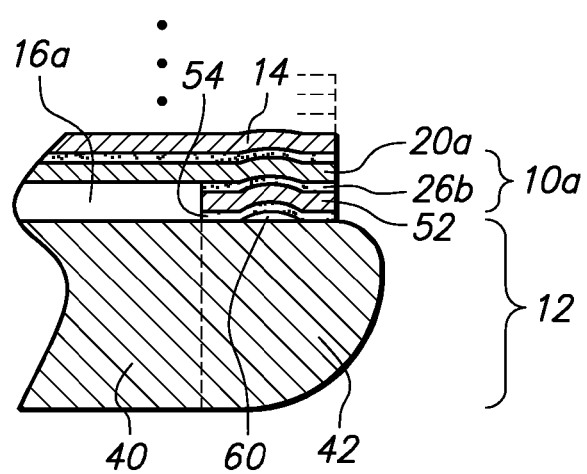
FIG. 7 is a cross sectional view of a first embodiment of a shield with an opaque border attached to the electronic device shown in FIG. 6.
Figure 8:
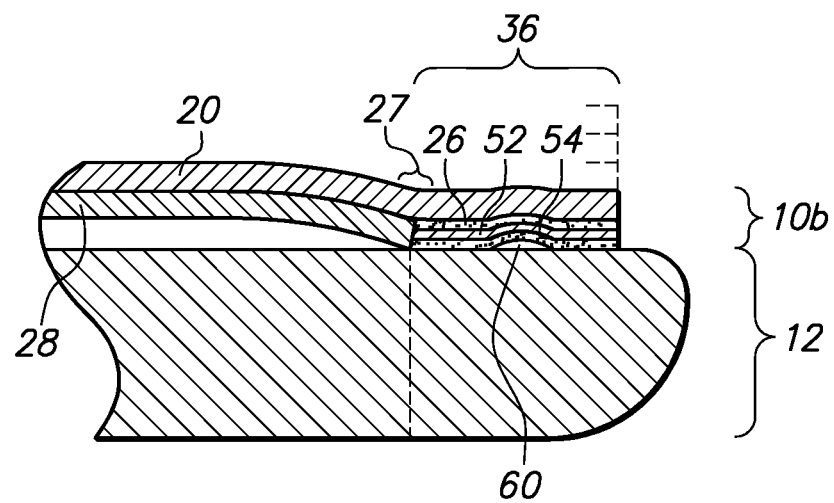
FIG. 8 is a cross sectional view of a second embodiment of a shield with an opaque border attached to the electronic device shown in FIG. 6.

Referring now to FIGS. 6-8, an opaque annular film 52 may be interposed between the outer peripheral portion 36 of the base transparent layer 20, 20a and the touch sensitive screen 12. The opaque annular film 52 may be incorporated into the shields 10, 10a discussed in relation to FIGS. 2-5. The opaque annular film 52 may be black, dark color, patterned, etc. so long as the pattern or color hides or mitigates visibility of air bubbles 60. The opaque transparent layer 52 hides any air bubbles 60 that may exist when attaching the shield 10, 10a to the touch sensitive screen 12. FIG. 6 illustrates a black border. However, upon further inspection of the border area in FIGS. 7 and 8, an air bubble 60 exists between the shield 10, 10a and the touch sensitive screen 12. Nonetheless, due to the opaque annular film 52, such air bubble 60 is not noticeable or is not as noticeable when viewing the touch sensitive screen 12.

More particularly, referring now to FIG. 7, the shield 10a may have an adhesive 26b disposed about the outer peripheral portion 36 of the base transparent layer 20b. The opaque annular film 52 may be attached to the base transparent layer 20b by way of the adhesive 26b. Adhesive 54 may now be coated, sprayed or disposed onto the bottom surface of the opaque annular film 52 for attachment of the shield 10a to the touch sensitive screen 12. The adhesive 26b may be thin so as to not appreciably add to the thickness of the base transparent layer 20. Alternatively, the adhesive 26b or 54 may be thick such as in the embodiment disclosed in FIGS. 4-5. Nonetheless, the film 52 and/or the adhesive 26b, 54 may independently or collectively be sufficiently thick so that the air gap 16a may be formed between the shield 10a and the touch sensitive screen 12.

Sacrificial layers 14a-n may be stacked on top of the base transparent layer 20a as discussed above in relation to FIGS. 2-5.

Referring now to FIG. 8, the shield 10 may also have an opaque annular film 52. The opaque annular film 52 may be disposed at the outer peripheral portion 36 of the base transparent layer 20. Preferably, the opaque annular film 52 and the adhesive 26, 54 is thinner than the protective liner 28, and more particularly, is thinner than the central portion 48 of the protective liner 28. The step 27 is formed at the outer peripheral edge of the protective liner 28. The opaque annular film 52 shown in FIG. 8 is attached to the base transparent layer 20 by way of adhesive 26. Adhesive 54 may be applied to the underside of the opaque annular film 52 to attach the shield 10 to the touch sensitive screen 12. Sacrificial layers 14a-n may also be stacked on top of the base transparent layer 20 as discussed above in relation to FIGS. 2-5.

An index of refraction of the adhesive and the transparent material which forms the sacrificial layers 14a-n, base transparent layer 20 and the protective liner 28 may have a refraction mismatch of 0.2 to minimize unwanted internal reflection, haze, maximize transmissions and contrast of the screen and to maintain the high brightness and contrast of the visual objects displayed on the touch sensitive screen 12. It is also contemplated that the upper surface of each of the sacrificial layers 14 and the exposed side 22 of the base transparent layer 20 may have a thin hard coating. The adhesive that attaches each of the sacrificial layers 14 together as well as the stack of sacrificial layers 14 to the base transparent layer 20 may be provided so that the peel strength is the same throughout the stack. Alternatively, the bottom most layer 14, 20 may have a higher peel value than the layers 14 above the bottom most layer 14, 20. In this manner, as the topmost sacrificial layer 14 is peeled from the lower sacrificial layers 14, the act of peeling the topmost sacrificial layer 14 does not also peel the lower sacrificial layers 14. The peel strength may range between about 25 to about 300 grams/inch. The adhesive discussed herein may be permanently attached to the layer immediately above the adhesive. Accordingly, when the topmost sacrificial layer 14 is peeled, no residue of the adhesive is left on the layer below. The exposed or top side of the fresh sacrificial layer 14 mostly, if not entirely is free from adhesive. Additionally, when all of the sacrificial layers 14 are removed from the shield 10, no adhesive residue is left on the exposed side 22 of the base transparent layer 20.

Each of the sacrificial layers 14, base transparent layer 20 and the protective layer 28 may have a thickness between about 1 mil to about 7 mil with each mil being 0.001" thick. Unless otherwise stated, the adhesive layer attaching the sacrificial layers 14 to each other as well as the sacrificial layers 14 to the base transparent layer 20 may add negligible thickness to the shield 10, 10a. By way of example and not limitation, if each of the sacrificial layers 14, the base transparent layer 20 and the protective layer 28 have a thickness of 2 mil, then the total thickness of the shield 10 may be 8 mil thick provided that there are only two sacrificial layers 14 and one base transparent layer 20 and one protective liner 28.

Figure 9:
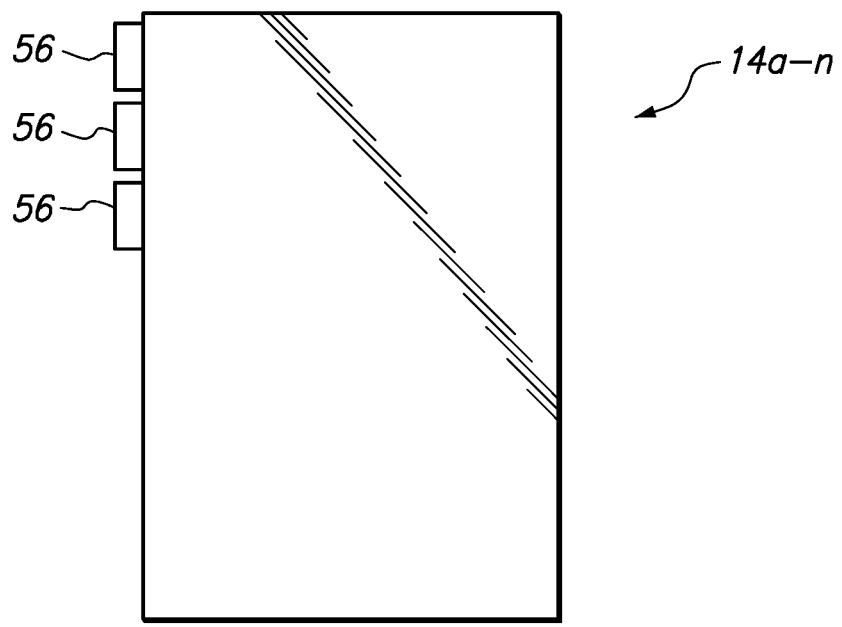
FIG. 9 is a top view of a stack of sacrificial layers with tabs for peeling a topmost layers, the stack being mountable to the shield shown in FIGS. 1-8.

The sacrificial layers 14a-n may be stacked upon each other. Preferably, the sacrificial layers may be generally coextensive with each other so that the stack of sacrificial layers 14a-n appear to be a single film. As discussed above, in order to assist in the peeling of only the top most sacrificial layer 14 while leaving the lower sacrificial layers 14 in place, the adhesive peel strength may be adjusted to be the weakest at the top most sacrificial layer and stronger as the top most sacrificial layer is peel away. Alternatively, or additionally, tabs 56 which are shown in FIG. 9 may be formed as part of the sacrificial layers 14. Each of the sacrificial layers 14a-n may be formed with the tab 56 that extends outward as shown in FIG. 9. No adhesive is formed on the area of the tab 56. Each of the tabs 56 may be offset or staggered with the tabs 56 of the other sacrificial layers so that the user can pull the tab 56 of the then top most sacrificial layer at the time to peel off the top most sacrificial layer 14. Other tabbing systems known in the art may be incorporated such as those shown and described in relation to Japanese Kokai Patent Publication Number 4-314537 and U.S. Pat. No. 6,777,055.

Figure 10:
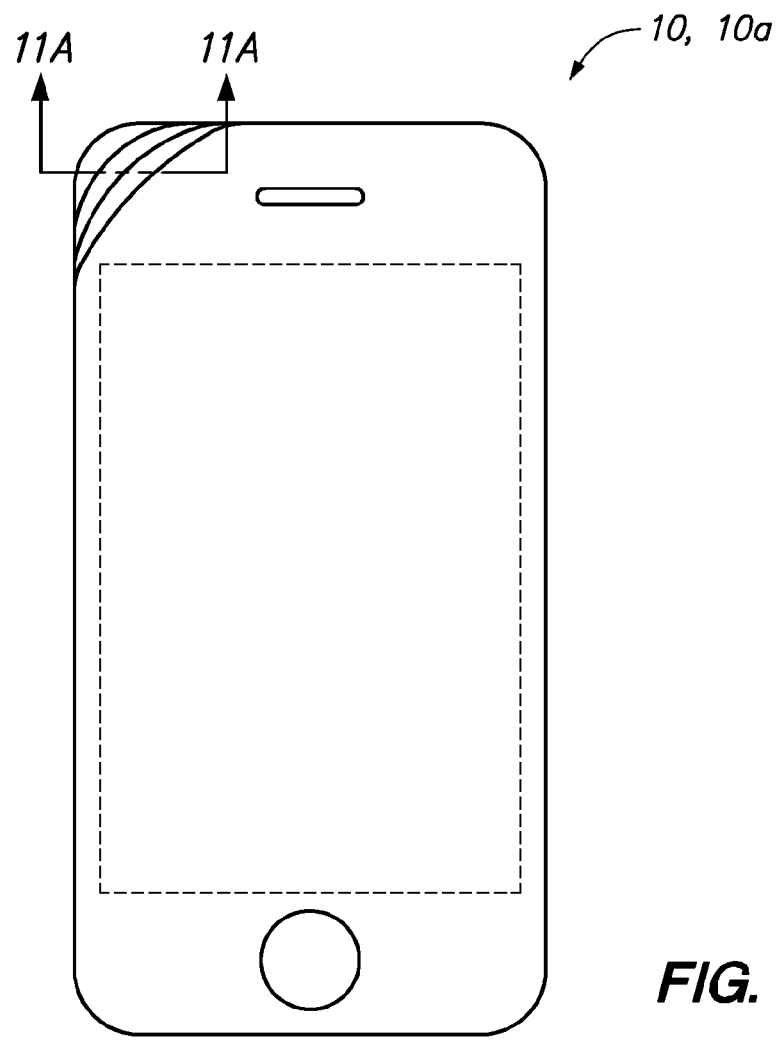
FIG. 10 is a top view of a stack of sacrificial layers with a stair step configuration for peeling a topmost layer, the stack being mountable to the shield shown in FIGS. 1-8.
Figure 11A:
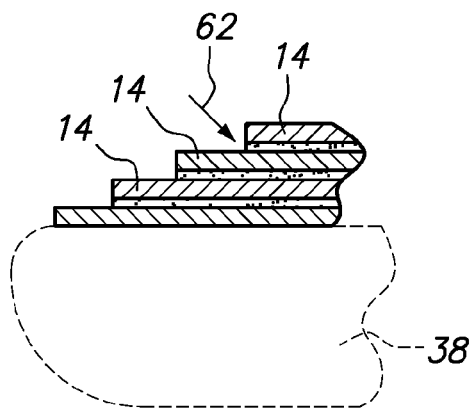
FIG. 11A is a cross sectional view of the stair step shown in FIG. 10.
Figure 11B:
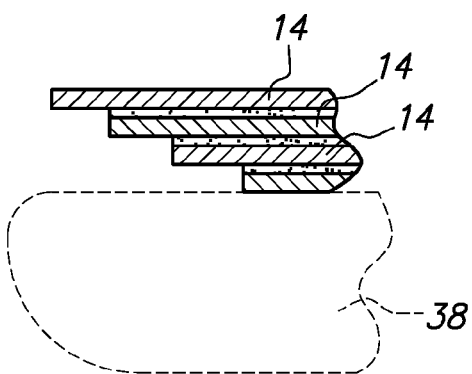
FIG. 11B is an alternative arrangement to the stair step shown in FIG. 11A.

Additionally or alternatively, a peel assist system shown in FIGS. 10-11B may be incorporated into the shield 10, 10a. By way of example and not limitation, a corner of the shield 10, 10a may have a stair step configuration. Although the upper left corner of the shield 10, 10a is shown as having the stair step configuration, any of the other corners, upper right, lower left and/or right corners may have the stair step configuration. A first configuration of the stair step is shown in FIG. 11A. Sacrificial layers 14 may be peeled off layer by layer. The top most sacrificial layer 14 may be peeled off with the aid of a sharp blade or fingernail that digs between the first and second top most layers 14 as shown by arrow 62 to initiate peeling of the top most layer 14. FIG. 11B illustrates a second configuration of the stair step configuration. The stair step configuration is reverse compared to the stair step configuration shown in FIG. 11A. The user may lift the top most layer 14 with his or her finger since the top most layer 14 extends over the rest of the stack of layers 14. The shield 10, 10a has been shown generically attached to the electronic device 38 for the purposes of clarification. However, any of the attachment methods discussed herein may be implemented in the shield 10, 10a embodiments shown in FIGS. 10-11B.

Certain embodiments of the shield 10 above were directed to a multi-layer shield 10. Either the base transparent layer 20 was adhered to a lower protective layer 28 and/or one or more sacrificial layers 14a-n. These layers 20, 28, 14a-n are each adhered to each other. The layers 20, 28, 14a-n and the adhesive may absorb impact shock caused when the electronic device 38 is dropped or the touch sensitive screen 12 hits a solid object. The impact is reduced at each adhesive interface where the softer adhesive may yield and spread out the impact force laterally instead of proceeding directly into the glass of the touch sensitive screen. Additionally, the stacked construction of the shield 10 and the sacrificial layers 14a-n retain the flexibility or bendability of the layers to maintain the tactile response for the touch sensitive screen.

Preferably, the base transparent layer 20, protective layer 28, and sacrificial layers 14 are fabricated from biaxially oriented polyethelene terephalate material (boPET).

Referring back to FIG. 1, the various embodiments of the shield and sacrificial layers disclosed herein may be enlarged to cover the front surface of the electronic device 38. An example of the enlarged shield is shown in FIG. 1 in hidden lines. Cutouts 58 may be made through the shield to allow for physical buttons and speakers on the electronic device 38.

In lieu of the opaque annular film 52, it is also contemplated that the base transparent layer 20, 20a may have an opaque printed border which serves the same function as the opaque annular film 52. The opaque border on the base transparent layer 20, 20a may be formed by a screen printing, etc. or other methods known in the art. It is also contemplated that the adhesive 26, 26a, 26b, 54 may be colored so as to be opaque and hide the air bubbles 60.

The above description is given by way of example, and not limitation. Given the above disclosure, one skilled in the art could devise variations that are within the scope and spirit of the invention disclosed herein, including various ways of forming the slit for the annular ring. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A combination electronic device and protective shield, the combination comprising:
    an electronic device having a touch sensitive screen that enables touch operation of the electronic device, the touch sensitive screen having a touch sensitive electronic visual display;
    a protective shield mounted to the touch sensitive screen of the electronic device via an adhesive layer, the adhesive layer disposed about an outer peripheral portion of the shield so that the adhesive layer surrounds a central portion of the shield, the shield having a shape that corresponds to the touch sensitive screen, and the central portion of the shield having a shape that corresponds to the touch sensitive electronic visual display, wherein the central portion of the shield covers and is lifted off the touch sensitive electronic visual display, wherein air is trapped between the shield, the touch sensitive electronic visual display, and the adhesive layer, and wherein the touch sensitive electronic visual display maintains touch sensitivity through the shield.

2. The combination of claim 1, wherein the shield further comprises a liner layer attached to an interior side of a base layer, the liner layer having an outer periphery smaller than an outer periphery of the base layer so as to form a step between the interior side of the base layer and the liner layer, wherein the step creates sufficient tension on the base layer to lift the central portion of the attached shield off the touch sensitive electronic visual display.

3. The combination of claim 1, wherein the adhesive layer is sufficiently thick to lift the central portion of the shield off the touch sensitive screen so that no part of the central portion contacts the touch sensitive electronic visual display.

4. The combination of claim 1, wherein the shield comprises a base layer and an annular film layer between a base layer and the adhesive, the annular film layer having a thickness and surrounding the central portion of the shield, wherein the thickness of the annular film layer causes the central portion of the shield to lift off the touch sensitive screen so that no part of the central portion contacts the touch sensitive electronic visual display.

5. A combination touch sensitive electronic device and transparent shield, the combination comprising:
an electronic device having a touch sensitive screen that enables touch operation of the electronic device, the touch sensitive screen having a touch sensitive electronic visual display; and
a transparent shield mounted on the touch sensitive screen of the electronic device, the shield comprising a base layer and an adhesive layer applied to an interior side of the base layer, the base layer having a shape that corresponds to the touch sensitive screen, and the adhesive layer surrounding a central portion of the shield and attaching the shield to the touch sensitive screen,
wherein the central portion of the attached shield covers the electronic visual display, wherein there is no adhesive between the central portion of the attached shield and the electronic visual display, wherein the adhesive layer traps air between the shield and the touch sensitive screen, and wherein the touch sensitive screen maintains touch sensitivity through the attached shield.

6. The touch sensitive electronic device of claim 5, wherein the shield further comprises a liner layer attached to the interior side of the base layer, the liner layer having an outer periphery smaller than an outer periphery of the base layer so as to form a step, wherein the step places the base layer into tension, and wherein the tension causes the central portion of the shield to lift off the touch sensitive screen.

7. The touch sensitive electronic device of claim 5, wherein the adhesive layer has a thickness sufficient to lift the central portion of the shield off the touch sensitive screen.

8. The touch sensitive electronic device of claim 5, wherein the shield further comprises an annular film layer between the base layer and the adhesive, the annular film layer having a thickness and surrounding the central portion of the shield, wherein the thickness of the annular film layer causes the central portion of the shield to lift off the touch sensitive screen.

9. The touch sensitive electronic device of claim 5, wherein the trapped air forms a planar air bearing between the central portion of the shield and the touch sensitive screen.

10. A transparent shield for a touch sensitive screen of a device, the device having a touch sensitive screen that enables touch operation of the device, and the touch sensitive screen having a touch sensitive visual display, the shield comprising:
a first transparent layer defining opposed first and second sides, the first transparent layer defining an outer periphery, the outer periphery configured to correspond to a shape of the touch sensitive screen of the device;
a layer of pressure sensitive adhesive disposed on an outer peripheral portion of the second side of the first transparent layer;
a second transparent layer defining opposed first and second sides, the first side of the second transparent layer being attached to a central portion of the second side of the first transparent layer, the central portion layer having a shape that corresponds to the visual display of the device, wherein an outer periphery of the second transparent layer is smaller than the outer periphery of the first transparent layer so as to define a step;
wherein the outer peripheral portion of the first transparent layer is attachable to the device so that the central portion of the second side of the first transparent layer is positioned over the touch sensitive visual display of the touch sensitive screen of the device, and wherein the step places the first transparent layer in tension when the outer peripheral portion of the first transparent layer is attached to the device, the tension being sufficient to lift the second transparent layer of the transparent shield off the touch sensitive screen and form an air gap between the attached shield and the touch sensitive screen.

11. The shield of claim 10 further comprising adhesive disposed between the central portion of the second side of the first transparent layer and the second transparent layer for attaching the first and second transparent layer to each other.

12. The shield of claim 11 wherein a difference in an index of refraction of the first and second transparent layers is less than 0.2.

13. The shield of claim 10 wherein the adhesive disposed on the outer peripheral portion of the second side of the first transparent layer is protected by a removable liner.

14. The shield of claim 10 further comprising one or more transparent sacrificial layers peelably removable from each other and the first side of the first transparent layer so that a top most sacrificial layer may be removed as desired.

15. The shield of claim 14 wherein the first and second transparent layers are thicker compared to the one or more sacrificial layers.

16. The shield of claim 14 wherein the sacrificial layers have staggered tabs for assisting in the peeling of the top most sacrificial layer.

17. The shield of claim 14 wherein a peel value is progressively stronger as the top most sacrificial layer is peeled.

18. The shield of claim 10 wherein the adhesive traps air between the shield and the touch sensitive screen to form an enclosed air gap.

19. The shield of claim 18 wherein the enclosed air gap is a planar air bearing, that maintains sensitivity of the touch sensitive screen through the shield.

20. The shield of claim 10 further comprising an opaque annular film at an outer peripheral portion of the first transparent layer.

21. A transparent protective shield for an electronic device, the electronic device having a touch sensitive screen that allows a user to operate the electronic device, the touch sensitive screen having a shape, and at least a portion of the touch sensitive screen having a touch sensitive visual display portion, the visual display portion having a shape, the shield comprising:

a base layer having an interior side, the base layer having a shape that corresponds to the shape of the touch sensitive screen; and an adhesive layer applied to the interior side of the base layer, the adhesive layer surrounding a central portion of the shield so that no adhesive is applied on an interior side of the central portion of the shield, the central portion of the shield having a shape that corresponds to the shape of the visual display portion, wherein the shield is attachable to the touch sensitive screen of the electronic device so that the adhesive layer of the attached shield surrounds the display portion of the touch sensitive screen, and so that the transparent shield covers the touch sensitive screen without the central portion of the shield adhering to the visual display portion of the touch sensitive screen, wherein the adhesive traps air between the transparent shield and the touch sensitive screen and wherein the touch sensitive screen maintains touch sensitivity through the attached shield and further comprising a liner layer attached to the interior side of the base layer, the liner layer having an outer periphery smaller than an outer periphery of the base layer so as to form a step, wherein the step places the base layer into tension and lifts the protective liner off the touch sensitive screen in response to the adhesive layer attaching the transparent shield to the electronic device.

* * * * *